United States Patent [19]

Allaway et al.

[11] 4,378,278

[45] Mar. 29, 1983

[54] POLYMER FOAMS PRODUCED BY ELECTRON BEAM RADIATION

[75] Inventors: James R. Allaway, Whitefish Bay; Daniel R. Bloch, Racine; Michael P. Fischer, Sturtevant, all of Wis.

[73] Assignee: S. C. Johnson & Son, Inc., Racine, Wis.

[21] Appl. No.: 306,442

[22] Filed: Sep. 28, 1981

[51] Int. Cl.³ ........................... C08J 9/00; C08F 2/46; C08L 33/08
[52] U.S. Cl. .............................. 204/159.22; 521/130; 521/149
[58] Field of Search .................... 264/48, 50; 521/130, 521/149; 204/159.22

[56] References Cited

U.S. PATENT DOCUMENTS 3,393,161 7/1968 Avis et al. ............................ 521/188
4,199,421 4/1980 Kamada et al. ................. 204/159.22

*Primary Examiner*—Allan Lieberman

[57] ABSTRACT

A process for forming a polymeric foam comprising mixing a liquid multi-functional acrylate monomer and a liquid nonionic fluoronated alkyl-ester surfactant, foaming the surfactant monomer mixture and passing the foamed surfactant monomer mixture under a source of electron beam radiation to polymerize the monomer into a polymeric foam structure.

2 Claims, No Drawings

POLYMER FOAMS PRODUCED BY ELECTRON BEAM RADIATION

BACKGROUND

This invention relates to a method of producing polymeric foams. More particularly, this invention relates to a process for producing polymeric foams by directly reacting a foamed mixture of monomers in the presence of electron beam radiation.

Polymeric foams have been produced by a variety of methods, including catalytic methods, heating, cross-linking, thermal decomposition of blowing agents in thermoplastic materials and the like. However, polymeric foams have not been made directly from acrylate-type monomers which have been foamed as monomers.

It has been surprisingly been found that a certain group of fluorochemical surfactants can produce stable foams of acrylic monomers for a time sufficient to enable the foams to be irradiated and react the monomers into a polymeric acrylic foam.

OBJECTS AND ADVANTAGES

It is, therefore, the primary object of the present invention to provide a process for directly manufacturing polymeric foams by using electron beam radiation.

It is a further object of the present invention to use electron beam radiation to form polymeric acrylic foams directly from a foamed monomer composition.

It is a further object of the present invention to provide a method for forming acrylic foams without applying heat.

It is a still further object of the present invention to utilize a particular class of surfactants to form stable monomer foams which can then be irradiated using electron beam radiation to form polymeric foams.

Still further objects and advantages of the process of the present invention will become more apparent from the following more detailed description thereof.

DETAILED DESCRIPTION OF THE INVENTION

The present invention relates to a method for forming polymeric foams which comprises:

(a) Mixing at least one liquid multi-functional acrylic monomer and a liquid nonionic alkyl-ester fluorocarbon surfactant;

(b) Foaming the mixture; and (c) Irradiating the mixture with high energy ionizing radiation having an energy of at least 150,000 electron volts at a dose rate no greater than 100 megarads per second and providing a dosage of from 0.75 to 15 megarads to form a polymeric foam.

The process of the present invention is useful for forming polymeric foams from various liquid multi-functional acrylate monomers. Examples of suitable monomers include the following: tripropylene glycol diacrylate, neopentyl glycol diacrylate, trimethylol propane triacrylate, trimethylol propane ethoxylate triacrylate, tetraethylene glycol diacrylate, 1,6 hexanediol diacrylate, pentaerythritol triacrylate, diethylene glycol diacrylate and mixtures thereof.

The polymeric foams can also include a reasonable amount of a monofunctional comonomer. These monofunctional monomers may not polymerize by themselves on exposure to electron beam radiation, but in the presence of a major percentage of multi-functional monomer, some percentages, up to about 25% by weight of monofunctional monomer, will copolymerize.

It is important that the monomers be such that they are in a liquid form at the processing conditions under which electron beam radiation will occur. Typically, such process conditions are room temperature and approximately one atmosphere pressure.

Generally, the monomer is utilized either alone or in combination with other monomers from the above liquid reactive multi-functional acrylate monomers. The relative ratio of these materials is not particularly pertinent.

The foaming agent utilized to form stable foams of the above monomers so that these foams can be irradiated to produce polymeric foams are liquid nonionic fluoronated alkyl-ester surfactants. In the fluorocarbon chain of the nonionic surfactants useful in the present invention it is necessary that the hydrocarbons on the carbon structure be replaced by fluorine to such a degree that the fluorocarbon chain or "tail" portion of the liquid surfactant be essentially a fluorocarbon. This does not imply the complete hydrogen replacement in all instances, though such will, for ease of commercial availability, generally be the situation.

The liquid nonionic fluoronated alkyl-ester surfactants can be generally represented by the formula

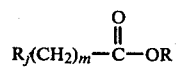

Where $R_f$ is a fluoro-alkyl group having from 3 to 12 carbon atoms, m is an integer from 2 to 12 and R is a low molecular weight polyoxyethylene, polyoxypropylene or polyoxyethylene-polyoxypropylene copolymer group. The particular molecular weight of the R group will be such that the fluoronated surfactant will have a viscosity of about 10 to 20,000 centipoise at 25° C. An example of a commercially available fluoronated alkyl-ester surfactant of the above type is Fluorad FC-430, available from the 3M Company, Minneapolis, Minn.

The fluoronated surfactant should be mixed with the liquid multi-functional acrylic monomer in an amount of from 0.05 to 5% by weight surfactant. It is within this range that foams can be formed which are sufficiently stable so as to enable the same to be conveniently processed using electron beam radiation. Generally, it has been found that the foams should have a sufficient foam stability so that the foams will be substantially stable for at least about thirty seconds.

The mixture of monomer and surfactant can be foamed using any of a large number of available foaming techniques, including blowing nitrogen gas or other gas through the surfactant monomer mixture, beating, or in some other way frothing the surfactant mixture, or any other conventional foaming method.

The foam of monomer and surfactant is then passed under a beam of ionizing electron radiation. Such radiation must have a sufficient energy so as to polymerize the monomers present within the foam. It has been found that electron beam energy, having an energy of greater than at least about 150,000 electron volts, is necessary to properly polymerize the monomers into a stable polymeric foam.

It is preferred that ionizing radiation of from 200,000 to 300,000 electron volts be utilized to form the polymer foams produced in the process of the present invention.

Of course, the energy level must be adjusted, depending upon the density and mass of the foams, so as to assure proper penetration of the electron beam into the foam structure.

The amount of radiation actually absorbed by the foam is the dose. Dose is measured in rads (radiation absorbed dose). One rad of radiation is equal to the absorption of 100 ergs of energy per gram of absorbing material. One megarad is $10^6$ rads.

The greater the dose, the more energy imparted to the treated substrate and the more likely that reaction will be initiated. Some monomers are more innately reactive than others and require a smaller dose to initiate the polymerization. For best results, the dose employed is balanced between that required to initiate polymerization and that which might cause degradation of the resulting polymer foam. The appropriate dose is, therefore, a function of (1) the reactivity of the monomer and (2) the amount of foam to be irradiated.

The dosage employed in the present process is at least about 0.75 megarads and no greater than about 15 megarads. In a dosage level of less than about 0.75 megarads, there is insufficient irradiation to react the monomers present within the foam mixture to form a polymerized foam. It is preferred to employ a dosage of at least about 8 megarads, since good foam stability characteristics occur at this level. At dosages of over 12 megarads, degradation of the resulting foam can result.

Irradiating processing apparatus dose may be determined in accordance with the following equation:

$$\text{Dose} = \frac{\text{Current Density}}{\text{Exposure Time}} \times C$$

wherein the current density is in milliamperes, the exposure time is the sample exposure time and C is the processing machine constant, an inherent value depending upon the particular machine employed. Exposure time often is expressed in line speed.

The rate at which the radiation is delivered to the treated substrate is the dose rate. An electron beam of a given energy can be delivered slowly or rapidly to provide the same total dose. In selecting irradiation parameters, normally, the energy of the electron beam is selected and the dose rate is selected. The desired total dose is then obtained by controlling the speed at which the treated material is exposed to the beam, i.e., the line speed. At a given dose rate, the total dose applied is inversely proportional to the line speed as the substance passes through the beam. The larger the desired total dose, the slower the substrate must pass through the beam to permit sufficient time for the total dose to accumulate.

In order to provide foams having acceptable physical properties, it is preferred that the dose rate should be no greater than about 100 megarads per second. At low line speeds, the dose rate can be substantially less than one megarad per second. For practical purposes, however, the dose rate is preferably greater than 4 megarads per second and more preferably from about 4 to 65 megarads per second.

Irradiation may be carried out in the presence of air, however, for the best results, the irradiation is conducted in the absence of oxygen. A radiation polymerization step can be carried out in a broad range of temperatures, with the preferred range being from about 20° to 30° C. At this range of ambient temperatures, the heating or cooling energy requirements of the process are minimized.

The process of the present invention is carried out by first mixing at least one liquid multifunctional acrylate monomer with from 0.05 to 5% by weight of a liquid nonionic fluoronated alkyl-ester surfactant, using a suitable mixing apparatus, including agitation, in-line blending and the like. This mixture is then foamed by entraining air, nitrogen or other gas throughout the mixture, either by gasifying the mixture or by beating or whipping the mixture in the presence of gas. This foamed mixture is then passed under the electron beam so as to polymerize the acrylate monomer to a polymer foam structure.

The polymer foams which are produced as a result of the present process may have a variety of shapes and surface characteristics. Typically, these foams are primarily open-cell foams, however, there can be some closed-cell characteristics. Furthermore, the foam of the present invention, depending upon the particular monomers utilized, and/or processing conditions can either be flexible or rigid.

At low dose or voltage, there may be excess monomer present in the foam structure. This monomer may act as a plasticizer and soften the foam. Also a conventional non-fugitive plasticizer may be added. It has also been observed that high dosages and high energy levels may affect the modulus of the foams and also produce soft or flexible foams.

The process of the present invention is particularly useful for applications where it is necessary to form a foam structure in the presence of other materials which may be adversely affected by other foaming and form curing methods.

The process of the present invention will now be illustrated by way of the following examples, which are for the purposes of illustration only. In the following examples, all parts and percentages are by weight and all temperatures in degrees Celsius, unless otherwise indicated.

EXAMPLE 1

Some 50 grams of diethylene glycol diacrylate and 0.05 grams of Fluorad FC-430 liquid nonionic fluoronated alkyl-ester surfactant, available from the 3M Company, are mixed in a 100 milliliter beaker. An aerator tube of fritted glass, medium pore size, is connected to a nitrogen gas supply at 30 cc's per minute and immersed in the acrylate/surfactant mixture. The resulting foam is allowed to bubble up out of the tube and into a petri dish. The foam is collected until about 5 grams has accumulated in the dish. The dish containing the liquid foam is exposed to electron beam radiation under a nitrogen gas blanket using an electron beam processor Model CB250/30/20, sold by Energy Sciences, Inc., having a machine constant of 30, adjusted to deliver 200 kev electrons at 5 milliamps at a line speed of 19 feet per minute. The resulting white, flexible foam had approximately 87% conversion to polymer.

EXAMPLE 2

The process of Example 1 is repeated with the exception that the mixture of monomer and surfactant is 98% tetraethylene glycol diacrylate and 2% Fluorad FC-430. The irradiation conditions were varied from 200 to 250 kev and from 0.5 to 10 milliamps. Irradiated foam was produced having moderate flexibility and open cell foam.

EXAMPLE 3

The procedure of Example 1 is repeated with the exception that the following monomers were mixed with 0.5% Fluorad FC-430 surfactant:
(a) Tripropylene glycol diacrylate;
(b) Neopentyl glycol diacrylate;
(c) Trimethylol propane triacrylate;
(d) Trimethylol propane ethoxy triacrylate;
(e) 1,6 hexanediol diacrylate;
(f) Pentaerythritol triacrylate.

The resulting foams were irradiated at 220 kev and at a milliamperage level of either 2 or 6 milliamps at a line speed of 18 feet per minute. In each case, a stable foam was prepared.

What I claim is:

1. A process for forming polymeric foams which comprises:
   (a) Mixing at least one liquid, multi-functional acrylate monomer and from 0.05 to 5% by weight of a liquid nonionic fluoronated alkyl-ester surfactant having the formula

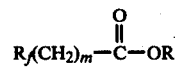

wherein $R_f$ is a fluoro alkyl group having from 3 to 12 carbon atoms, m is an integer from 2 to 12 and R is a low molecular weight polyoxyethylene, polyoxypropylene or polyoxyethylene polyoxypropylene copolymer group;
   (b) foaming the monomer surfactant mixture, and
   (c) irradiating the foamed monomer surfactant mixture with high energy ionizing radiation having an energy of at least about 150,000 electron volts at a dose rate no greater than 100 megarads per second to provide a dosage of from 0.75 to 15 megarads to form a polymeric foam material.

2. The process of claim 1, wherein said liquid, multi-functional acrylate is selected from the group consisting essentially of tripropylene glycol diacrylate, neopentyl glycol diacrylate, trimethylol propane triacrylate, trimethylol propane ethoxy triacrylate, tetraethylene glycol diacrylate, 1,6 hexanediol diacrylate, pentaerythritol triacrylate and mixtures thereof.

* * * * *